US010146415B2

(12) United States Patent
Ji et al.

(10) Patent No.: US 10,146,415 B2
(45) Date of Patent: Dec. 4, 2018

(54) METHOD AND TERMINAL DEVICE FOR CONTROLLING A TERMINAL DEVICE IN A LOCKED AND UNLOCKED STATE

(75) Inventors: Dawei Ji, Beijing (CN); Min Zhang, Beijing (CN)

(73) Assignees: LENOVO (BEIJING) LIMITED, Beijing (CN); Beijing Lenovo Software Ltd., Beijing (CN)

( * ) Notice: Subject to any disclaimer, the term of this patent is extended or adjusted under 35 U.S.C. 154(b) by 210 days.

(21) Appl. No.: 14/002,314

(22) PCT Filed: Mar. 1, 2012

(86) PCT No.: PCT/CN2012/071821
§ 371 (c)(1),
(2), (4) Date: Aug. 29, 2013

(87) PCT Pub. No.: WO2012/116647
PCT Pub. Date: Sep. 7, 2012

(65) Prior Publication Data
US 2013/0332885 A1 Dec. 12, 2013

(30) Foreign Application Priority Data

Mar. 2, 2011 (CN) .......................... 2011 1 0050089
Aug. 15, 2011 (CN) .......................... 2011 1 0233517

(51) Int. Cl.
G06F 3/0484 (2013.01)
G06F 1/32 (2006.01)
G06F 3/0488 (2013.01)

(52) U.S. Cl.
CPC ........ *G06F 3/04847* (2013.01); *G06F 1/3206* (2013.01); *G06F 1/3287* (2013.01); *G06F 3/0484* (2013.01); *G06F 3/04883* (2013.01)

(58) Field of Classification Search
CPC .... G06F 3/04883; G06F 3/017; G06F 3/0481; G06F 21/00; G06F 21/36
(Continued)

(56) References Cited

U.S. PATENT DOCUMENTS

2007/0150842 A1* 6/2007 Chaudhri et al. ............. 715/863
2010/0079380 A1* 4/2010 Nurmi ........................... 345/172
(Continued)

FOREIGN PATENT DOCUMENTS

CN 101604223 A 12/2009
CN 101625620 A 1/2010
(Continued)

OTHER PUBLICATIONS

International Search Report issued in PCT/CN2012/071821 dated Jun. 14, 2012 (3 pages).
(Continued)

*Primary Examiner* — Christopher J Fibbi
(74) *Attorney, Agent, or Firm* — Osha Liang LLP

(57) ABSTRACT

Disclosed are a method for controlling a terminal device, a terminal device and an electronic device. The method comprises: acquiring a first input; determining, in the locked state, a first instruction of the first instruction set corresponding to the first input, the first instruction being an unlocking instruction; controlling a switching from the locked state to the unlocked state according to the unlocking instruction; determining, in the unlocked state, a second instruction of the second instruction set corresponding to the first input; and responding to the second instruction. With the present invention, user operations are simplified, and intelligence of the terminal device is improved.

14 Claims, 9 Drawing Sheets

(58) Field of Classification Search
USPC .................................................. 715/833, 863
See application file for complete search history.

(56) References Cited

U.S. PATENT DOCUMENTS

| | | | |
|---|---|---|---|
| 2010/0174796 A1* | 7/2010 | Fleck .................... | G06F 1/3203 709/206 |
| 2010/0257490 A1* | 10/2010 | Lyon et al. .................... | 715/863 |
| 2011/0316797 A1* | 12/2011 | Johansson ..................... | 345/173 |
| 2012/0036556 A1* | 2/2012 | LeBeau .................. | G06F 3/048 726/3 |
| 2012/0060123 A1* | 3/2012 | Smith ........................... | 715/833 |
| 2012/0069231 A1* | 3/2012 | Chao .................. | G06F 3/04883 348/333.01 |
| 2012/0223890 A1* | 9/2012 | Borovsky ........... | G06F 3/04883 345/173 |

FOREIGN PATENT DOCUMENTS

| | | |
|---|---|---|
| CN | 101882046 A | 11/2010 |
| CN | 102111503 A | 6/2011 |

OTHER PUBLICATIONS

Written Opinion of the International Searching Authority issued in PCT/CN2012/071821 dated Jun. 14, 2012 (4 pages).

Patent Abstracts for Publication No. CN 101882046 A, Publication Date: Nov. 10, 2010 (1 Page).

Patent Abstracts for Publication No. CN 101604223 A, Publication Date: Dec. 16, 2009 (1 Page).

Patent Abstracts for Publication No. CN 101625620 A, Publication Date: Jan. 13, 2010 (1 Page).

Office Action issued in corresponding Chinese Application No. 201110233517.1 dated Dec. 4, 2015, and English translation thereof (14 pages).

Office Action issued in corresponding Chinese Application No. 201110233517.1 dated May 25, 2015, and English translation thereof (5 pages).

Office Action issued in corresponding Chinese Application No. 201110233517.1 dated Sep. 12, 2014, and English translation thereof (15 pages).

Office Action issued in corresponding Chinese Application No. 201110050089.9 dated Apr. 28, 2013, and English translation thereof (18 pages).

Office Action issued in corresponding Chinese Application No. 201110050089.9 dated Jan. 15, 2014, and English translation thereof (19 pages).

Office Action issued in corresponding Chinese Application No. 201110233517.1 dated Jun. 20, 2016, and English translation thereof (15 pages).

* cited by examiner

METHOD AND TERMINAL DEVICE FOR CONTROLLING A TERMINAL DEVICE IN A LOCKED AND UNLOCKED STATE

CROSS-REFERENCE TO RELATED APPLICATIONS

This application is a National Phase application of, and claims priority to, No. PCT/CN2012/071821, filed on Mar. 1, 2012, entitled "METHOD FOR CONTROLLING A TERMINAL DEVICE, TERMINAL DEVICE AND ELECTRONIC DEVICE," which claims priority to the Chinese Patent Application No. 201110050089.9, filed on Mar. 2, 2011 and the Chinese Patent Application No. 201110233517.1, filed on Aug. 15, 2011. All of the PCT Application and Chinese Applications are incorporated herein by reference in their entireties.

FIELD OF THE INVENTION

The present application relates to the field of mobile terminal technology, and in particular, to a method for controlling a terminal device, a terminal device, and an electronic device.

BACKGROUND OF THE INVENTION

With continuous development of technologies, such as mobile communication, computer processing and so on, terminal devices are becoming more and more intelligent as required by users. The term "intelligent" used herein means that terminal devices are used to not only place phone calls, but also web-surf, navigation, TV, music, etc. To achieve these functionalities, an intelligent terminal device usually has a lot of function modules, such as, a WIFI (Wireless Fidelity) module, a GPS (Global Positioning System) module, a CMMB (China Mobile Multimedia Broadcasting) module, or the like.

On the other hand, by receiving operations of key pressing or operations, such as sliding or clicking on a touch screen, from a user, a terminal device usually may receive inputs from the user and implement corresponding instructions. When the terminal device is temporarily not used by the user, it may enter into a locked state (automatically or manually controlled by user operations). At this time, unless it is unlocked with special operations of the user (pressing a specified key combination or performing some specified sliding operations), or it is used for calling emergency numbers, the terminal device will not respond to any other input from the user. In this way, some troubles, such as undesired power consumption or placing a wrong call, due to a keyboard or screen being touched accidently (for example, touched by some other things when placed in a bag) may be prevented.

However, in prior art, if the user wants to use a certain function of the terminal device when the terminal device is in the locked state, the user performs a series of troublesome operations. For example, an unlocking operation or a screen wake-up operation is first required to be performed, a desired function module is found in a corresponding directory, an enable option is selected from options, and then a corresponding interface is shown, and so forth. For another example, with respect to an electronic device with a touch screen, a typical scenario will be: activating the screen→sliding to unlock→turning over pages to find an application or service→clicking to launch the corresponding application or service. With the substantial increase of the number of applications or services and augment of the storage capacities of electronic devices, it will be increasingly difficult for the above operations. As a result, the "intelligence" of an intelligent cell-phone is greatly reduced.

SUMMARY OF THE INVENTION

Embodiments of the present invention provide a method for controlling a terminal device, a terminal device, and an electronic device, which can improve the intelligence of terminal devices.

To achieve the above object, according to an embodiment of the present invention there is provided a solution as follows: a method applied in a terminal device for controlling the terminal device, the terminal device having a full instruction set, and the terminal device having a locked state in which the terminal device responds to a first instruction set which is a first portion of the full instruction set and an unlocked state in which the terminal device responds to a second instruction set which is a second portion of the full instruction set, wherein the number of instructions in the first instruction set is lower than the number of instructions in the second instruction set, the method comprising:

acquiring a first input;

determining, in the locked state, a first instruction of the first instruction set corresponding to the first input, the first instruction being an unlocking instruction;

controlling a switching from the locked state to the unlocked state according to the unlocking instruction;

determining, in the unlocked state, a second instruction of the second instruction set corresponding to the first input; and responding to the second instruction.

According to an embodiment of the present invention, the step of determining a second instruction of the second instruction set corresponding to the first input in the unlocked state comprises:

determining a function module corresponding to the first input according to the first input, wherein the function module is in an active state when the terminal device is in the locked state; and determining an invoking instruction for invoking an application corresponding to the function module as the second instruction.

According to an embodiment of the present invention, the step of determining a second instruction of the second instruction set corresponding to the first input in the unlocked state comprises:

determining a function module corresponding to the first input according to the first input, wherein the function module is in a sleep state when the terminal device is in the locked state; and determining an enable instruction for enabling the function module as the second instruction.

According to an embodiment of the present invention, the step of determining a second instruction of the second instruction set corresponding to the first input in the unlocked state comprises steps of:

determining a function module corresponding to the first input according to the first input, wherein the function module is in a sleep state when the terminal device is in the locked state; and determining an enable instruction for enabling the function module and an invoking instruction for invoking an application corresponding to the function module as the second instructions.

According to an embodiment of the present invention, the terminal device has a touch screen, and the first input comprises a sliding input on the touch screen; and
  wherein the step of determining a second instruction of the second instruction set corresponding to the first input in the unlocked state comprises:
  determining an instruction corresponding to a direction and/or shape of a sliding track generated by the sliding input as the second instruction, based on preset correspondences between directions and/or shapes of sliding tracks and respective instructions within the second instruction set, according to the direction and/or shape of the sliding track generated by the sliding input.

According to an embodiment of the present invention, the terminal device has a touch screen, and the first input comprises an input of clicking or dragging a screen lock on the touch screen on which there are displayed a plurality of screen locks; and
  wherein the step of determining a second instruction of the second instruction set corresponding to the first input in the unlocked state comprises:
  determining an instruction corresponding to the clicking or dragging of the screen lock as the second instruction, based on preset correspondences between screen locks and respective instructions within the second instruction set, according to the clicking or dragging of the screen lock.

According to an embodiment of the present invention, the step of determining a first instruction comprises:
  detecting, in the locked state, an input operation, the input operation generating a continuous track;
  determining an end position of the continuous track;
  judging whether the end position falls into a preset state switching region to obtain a judging result; and
  generating the first instruction if the judging result indicates that the end position falls into the state switching region.

According to an embodiment of the present invention, the step of determining a second instruction comprises:
  determining the second instruction corresponding to the end position according to preset correspondences between end positions and instructions.

According to an embodiment of the present invention, the method further comprises:
  determining a start position of the continuous track;
  wherein the step of determining the second instruction corresponding to the end position according to preset correspondences between end positions and instructions comprises:
  determining the second instruction corresponding to the end position, according to preset correspondences between end positions and instructions, based on the start position.

According to an embodiment of the present invention, different start positions correspond to different applications, and different end positions related to a same start position correspond to different operating objects/parameters for a same application, and wherein the step of determining the second instruction corresponding to the end position comprises:
  determining the second instruction according to an application corresponding to the start position and operating objects/parameters corresponding to the end position.

According to an embodiment of the present invention, the method further comprises:
  determining, in the locked state, positions for displaying, in the state switching region, at least two operating objects/parameters of the application corresponding to the start position according to the start position of the continuous track; and
  displaying the at least two operating objects/parameters at the respective positions for displaying in the state switching region as candidate end positions.

According to an embodiment of the present invention, there is provided a terminal device. The terminal device has a full instruction set, and the terminal device has a locked state in which the terminal device responds to a first instruction set which is a first portion of the full instruction set and an unlocked state in which the terminal device responds to a second instruction set which is a second portion of the full instruction set, wherein the number of instructions in the first instruction set is lower than the number of instructions in the second instruction set. The terminal device comprises:
  an acquiring unit configured for acquiring a first input;
  a first resolving unit configured for determining, in the locked state, a first instruction of the first instruction set corresponding to the first input, the first instruction being an unlocking instruction;
  an unlocking unit configured for controlling a switching from the locked state to the unlocked state according to the unlocking instruction;
  a second resolving unit configured for determining, in the unlocked state, a second instruction of the second instruction set corresponding to the first input; and
  a responding unit configured for responding to the second instruction.

According to an embodiment of the present invention, the second resolving unit comprises:
  a first function module determining sub-unit configured for determining a function module corresponding to the first input according to the first input, wherein the function module is in an active state when the terminal device is in the locked state; and
  a first determining sub-unit configured for determining an invoking instruction for invoking an application corresponding to the function module as the second instruction.

According to an embodiment of the present invention, the second resolving unit comprises:
  a second function module determining sub-unit configured for determining a function module corresponding to the first input according to the first input, wherein the function module is in a sleep state when the terminal device is in the locked state; and
  a second determining sub-unit configured for determining an enable instruction for enabling the function module as the second instruction.

According to an embodiment of the present invention, the second resolving unit comprises:
  a third function module determining sub-unit configured for determining a function module corresponding to the first input according to the first input, wherein the function module is in a sleep state when the terminal device is in the locked state; and
  a third determining sub-unit configured for determining an enable instruction for enabling the function module and an invoking instruction for invoking an application corresponding to the function module as the second instructions.

According to an embodiment of the present invention, the terminal device has a touch screen, and the first input comprises a sliding input on the touch screen; and
  wherein the second resolving unit comprises:
  a fourth determining sub-unit configured for determining an instruction corresponding to a direction and/or shape of a sliding track generated by the sliding input as the second instruction, based on preset correspondences between directions and/or shapes of sliding tracks and respective instructions within the second instruction set, according to the direction and/or shape of the sliding track generated by the sliding input.

According to an embodiment of the present invention, the terminal device has a touch screen, and the first input comprises an input of clicking or dragging a screen lock on the touch screen on which there are displayed a plurality of screen locks; and wherein the second resolving unit comprises:
a fifth determining sub-unit configured for determining an instruction corresponding to the clicking or dragging of the screen lock as the second instruction, based on preset correspondences between screen locks and respective instructions within the second instruction set, according to the clicking or dragging of the screen lock.

According to an embodiment of the present invention, there is provided a method applied in a terminal device for controlling the terminal device, the terminal device having a full instruction set, and the terminal device having a locked state in which the terminal device responds to a first instruction set which is a first portion of the full instruction set and an unlocked state in which the terminal device responds to a second instruction set which is a second portion of the full instruction set, wherein the number of instructions in the first instruction set is lower than the number of instructions in the second instruction set, the method comprising:

acquiring, in the locked state, a first input;
determining a first instruction and a second instruction corresponding to the first input, wherein the first instruction belongs to the first instruction set and the second instruction belongs to the second instruction set;
responding, in the locked state, to the first instruction; and
responding, in the unlocked state, to the second instruction.

According to an embodiment of the present invention, the first instruction is an unlocking instruction, and
wherein the step of responding to the first instruction in the locked state comprises:
controlling a switching from the locked state to the unlocked state according to the unlocking instruction.

According to an embodiment of the present invention, the step of determining a second instruction corresponding to the first input comprises:
determining, in the locked state, an application corresponding to the first input and operating objects/parameters for the application.

According to an embodiment of the present invention, the step of responding to the second instruction in the unlocked state comprises:
launching an application corresponding to the unlocking operation based on the operating objects/parameters after the locked state is switched to the unlocked state.

According to an embodiment of the present invention, the first input generates a continuous track, and the step of determining an application corresponding to the first input and operating objects/parameters for the application in the locked state comprises:
determining a corresponding application according to the start position of the continuous track, and determining operating objects/parameters for the application according to the end position of the continuous track.

According to an embodiment of the present invention, the method further comprises:
determining, in the locked state, positions for displaying, within the state switching region, at least two operating objects/parameters of the application corresponding to the start position according to the start position of the continuous track; and
displaying the at least two operating objects/parameters at the respective positions within the state switching region as candidate end positions.

According to an embodiment of the present invention, the step of responding to the second instruction in the unlocked state comprises:
judging whether a function module corresponding to a first application invoked by the second instruction is enabled to generate judging information;
enabling the function module when the judging information indicates that the function module corresponding to the application invoked by the second instruction is not enabled; and
invoking the application according to the second instruction.

According to an embodiment of the present invention, there is further provided a terminal device, the terminal device having a full instruction set, and the terminal device having a locked state in which the terminal device responds to a first instruction set which is a first portion of the full instruction set and an unlocked state in which the terminal device responds to a second instruction set which is a second portion of the full instruction set, wherein the number of instructions in the first instruction set is lower than the number of instructions in the second instruction set, the terminal device comprising:

an acquiring unit configured for acquiring, in the locked state, a first input;
an resolving unit configured for determining a first instruction and a second instruction corresponding to the first input, wherein the first instruction belongs to the first instruction set and the second instruction belongs to the second instruction set;
a first responding unit configured for responding, in the locked state, to the first instruction; and
a second responding unit configured for responding, in the unlocked state, to the second instruction.

In an embodiment of the present invention, when the user performs a first input in the case where the terminal device is in the locked state, the terminal device, after the first input is resolved into an unlocking instruction and the terminal device is switched from the locked state to the unlocked state, will also resolve the first input into a second instruction which may be responded to in the unlocked state, and respond to the second instruction. In this way, with the unlocking operation, the user may not only switch the terminal device from the locked state to the unlocked state, but also resolve the unlocking operation into a second instruction which may be responded to in the unlocked state, and respond to the second instruction. The process for invoking the function module corresponding to the second instruction is thus simplified, user operations are reduced, and the intelligence of the terminal device is improved.

According to an embodiment of the present invention, there is provided an electronic device, the electronic device having a locked state and an unlocked state, the electronic device comprising:
a detecting unit configured for detecting, in a locked state, an input operation, the input operation generating a continuous track;

an end position determining unit configured for determining an end position of the continuous track;
a judging unit configured for judging whether the end position falls into a preset state switching region to obtain a judging result;
a first instruction generating unit configured for generating a first instruction when the judging result indicates that the end position falls into the state switching region, the first instruction being a state switching instruction;
a second instruction determining unit configured for determining a second instruction corresponding to the end position according to preset correspondences between end positions and instructions; and
an instruction executing unit configured for switching the electronic device into the unlocked state by executing the first instruction, and executing the second instruction corresponding to the end position of the input operation.

The electronic device according to the embodiment further comprises:
a start position determining unit configured for determining a start position of the continuous track;
wherein the second instruction determining unit is further configured for: determining the second instruction corresponding to the end position, based on the start position, according to preset correspondences between end positions and instructions.

With the embodiments of the present invention, a plurality of end positions may be provided for the input operations of the user, and different instructions in the unlocked state correspond to different end positions. In this way, when the user is performing an unlocking operation, not only the electronic device can be switched to the unlocked state, but also a certain instruction comprising launching of a certain application can be executed directly in the unlocked state (even operating objects/parameters for a certain application may be operated in some cases). Therefore, operations for searching in massive information by the user are reduced, thereby the intelligence of the electronic device is improved.

BRIEF DESCRIPTION OF THE DRAWINGS

For the purpose of describing the embodiments of the present invention in a clear manner, figures required by the embodiments will be introduced briefly below. Obviously, the figures described below are only some embodiments of the present invention, and other figures may be derived from these figures by one ordinarily skilled in the art without any inventive effort.

DETAILED DESCRIPTION OF PREFERRED EMBODIMENTS

Figure 1:
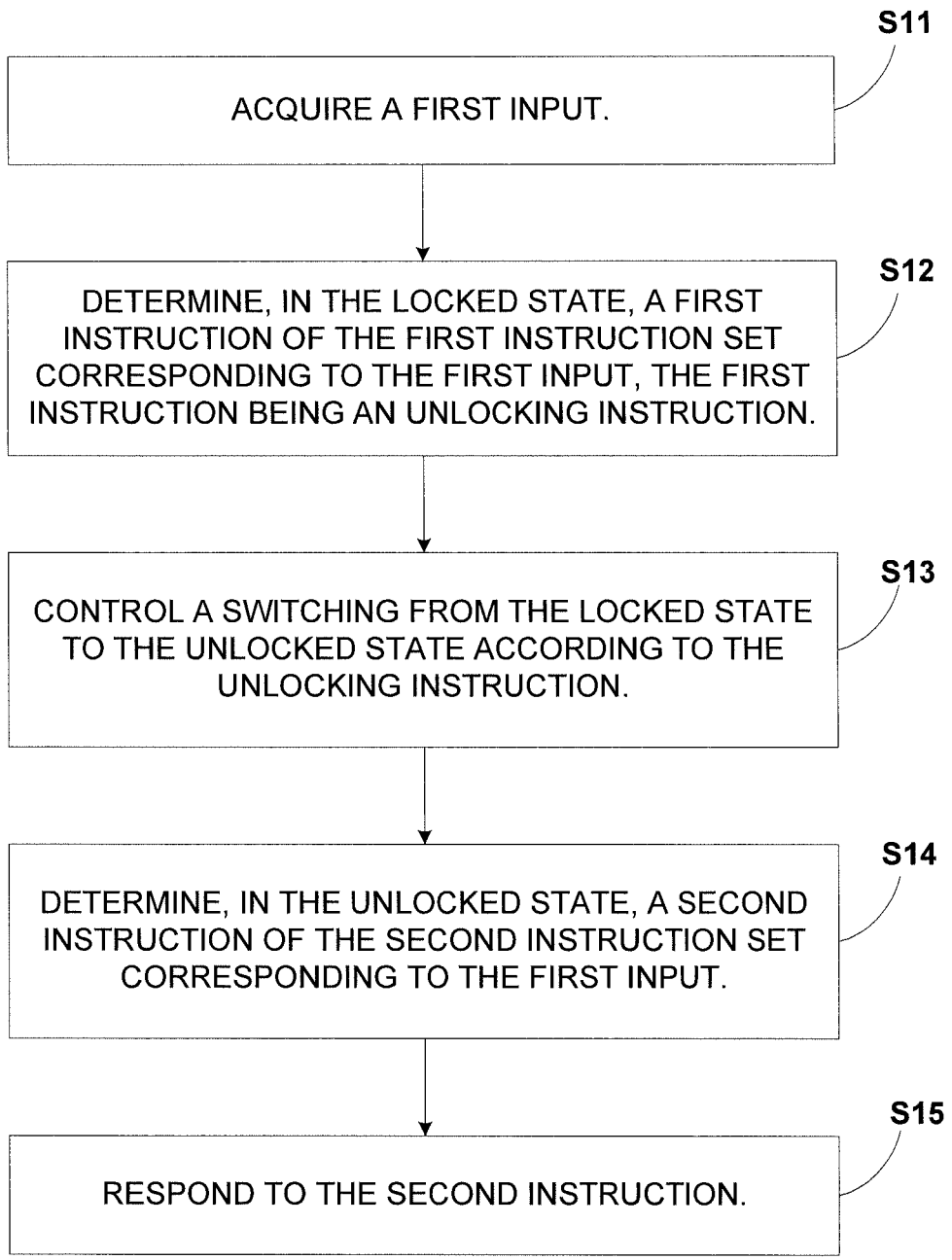
FIG. 1 is a flow chart of a method according to an embodiment of the present invention.

Hereinafter, technical solutions in the embodiments of the present invention will be described in a clear and thorough manner with reference to the figures in the embodiments of the present invention. Obviously, the described embodiments are merely a part of the embodiments of the present invention rather than all the embodiments. Based on these embodiments of the present invention, all other embodiments that can be derived by one ordinarily skilled in the art shall be embraced by the scope of the present invention.

An embodiment of the present invention provides a method applied in a terminal device for controlling the terminal device. First of all, it should be understood that the terminal device has a full instruction set, and the terminal device has a locked state in which the terminal device may respond to a first instruction set which is a first portion of the full instruction set and an unlocked state in which the terminal device may respond to a second instruction set which is a second portion of the full instruction set, and the number of instructions in the first instruction set is lower than the number of instructions in the second instruction set.

That is to say, the terminal device in the locked state may respond to a portion of instructions. In other words, the locked state refers to a state in which the terminal device may respond to only an instruction within the first instruction set. The instructions within the first instruction set comprise communication prompt instructions (for example, an incoming call prompt instruction, an SMS prompt instruction, etc.), timing reminding instructions (for example, an alarm clock, a memo, etc.), unlocking authentication, unlocking instructions, or the like. When the terminal device is in the locked state, the terminal device may be switched from the locked state to the unlocked state by executing an unlocking instruction. It should be noted that, in the locked state, an unlocking authentication may be generated, and unlocking authentication information is received. If the unlocking authentication is passed, an unlocking instruction can be generated. The unlocking authentication may be authentication for a predetermined string of characters, a predetermined track of touches, or a predetermined biometric feature. That is to say, the unlocking authentication is used to prompt the user to input information for the unlocking authentication, and the unlocking instruction is used to switch the terminal device from the locked state to the unlocked state.

The terminal device in the unlocked state may also respond to a portion of the instructions, while this portion of the instructions may be almost all instructions within the full instruction set. For example, it may comprise placing calls, accessing local data, accessing local networks, or the like. It may also comprise the instructions which may be responded to in the locked state, such as the communication prompts, timing reminding, etc.

Therefore, the terminal device in the locked state and in the unlocked state may respond to a portion of the instructions, respectively. If the instructions which may be responded to in the locked stated constitute a first instruction set, and the instructions which may be responded to in the unlocked stated constitute a second instruction set, the intersection of the first instruction set and the second instruction set is usually non-empty. Furthermore, since almost all of the instructions which may be responded to in the locked state can be responded to in the unlocked state, and some instructions which may be responded to in the unlocked state cannot be responded to in the locked state, the number of instructions within the second instruction set is typically lower than that within the first instruction set.

Based on the above description, according to an embodiment of the present invention there is provided a method for controlling a terminal device. Referring to FIG. 1, the method comprises steps of:

S11: acquiring a first input;

The first input may be a user input for the terminal device in the locked state, and may be a certain kind of unlocking authentication operation. For example, a specified string of characters is input via a keyboard, or a specified sliding track or direction on a touch screen is input, and so forth.

S12: determining, in the locked state, a first instruction of the first instruction set corresponding to the first input, the first instruction being an unlocking instruction;

When the terminal device in the locked state receives the above first input, if the first input meets a preset condition, the terminal device may identify it as unlocking authentication operation, and generate an unlocking instruction after the authentication is passed.

S13: controlling a switching from the locked state to the unlocked state according to the unlocking instruction;

After the unlocking instruction is generated, the terminal device may be switched from the locked state to the unlocked state. At this time, the terminal device will be able to respond not only to the instructions within the first instruction set, but also to the instructions within the second instruction set.

S14: determining, in the unlocked state, a second instruction of the second instruction set corresponding to the first input;

In embodiments of the present invention, the first input corresponds not only to an unlocking instruction within the first instruction set, but also to a second instruction within the second instruction set. In specific implementations, a correspondence between the first input and the second instruction may be preset. When the first input is received and the terminal device is switched from the locked state to the unlocked state, the second input corresponding to the first input may be determined by referring to the correspondence. It should be noted that in the embodiment of the present invention, with regard to the step S12, "determining, in the locked state, a first instruction of the first instruction set corresponding to the first input, the first instruction being an unlocking instruction," and the step S14, "determining, in the unlocked state, a second instruction of the second instruction set corresponding to the first input," the first instruction determined at the step S12 and the second instruction determined at the step S14 are both determined based on the first input acquired at the step S11. In other words, when an operating subject finishes the first input at the terminal device, the terminal device acquires a sliding track and/or direction or special information of key pressing corresponding to the first input, and the first instruction is determined in the locked state according to the sliding track and/or direction or special information of key pressing corresponding to the first input, and the second instruction is determined in the unlocked state according to the sliding track and/or direction or special information of key pressing corresponding to the first input as well.

S15: responding to the second instruction.

After the second instruction of the second instruction set corresponding to the first input is determined, the terminal device responds to the second instruction in the unlocked state.

The method for controlling a terminal device according to the embodiment of the present invention is illustrated hereinbefore. Based thereon, in an embodiment of the present invention, when the user performs the first input in the case where the terminal device is in the locked state, the terminal device, after the first input is resolved into an unlocking instruction and the terminal device is switched from the locked state to the unlocked state, will also resolve the first input into a second instruction which may be responded to in the unlocked state, and respond to the second instruction. In this way, by the unlocking operation, the user may not only switch the terminal device from the locked state to the unlocked state, but also resolve the unlocking operation into a second instruction which may be responded to in the unlocked state, and respond to the second instruction. The second instructions within the second instruction set are usually instructions related to certain function modules of the terminal device. Therefore, the process for implementing the function of the function module corresponding to the second instruction may be simplified, and user operations are reduced and the intelligence of the terminal device is improved.

To understand the embodiments of the present invention better, function modules of the terminal device will be introduced below. In an embodiment of the present invention, a function module typically refers to a hardware component unit. Functions can only be implemented with a terminal device having such hardware-based function modules. For example, with regard to a GSM module, its function is to place a phone call, receive/transmit SMS messages, or the like. In terms of hardware, the GSM module comprises a signal transceiver, receive/transmit antennas, etc. Signals from the calling party can be received and local signals can be transmitted only through these hardware-based devices.

However, support in hardware only is not enough for practical usage of various function modules, and a human-machine interactive interface provided by softwares is usually required for a user to perform operations, such as lookup in communication information, edit in SMS messages, etc. Therefore, for embodiments of the present invention, a function module is equivalent to a hardware component unit of the terminal device, and the application corresponding to the function module refers to the human-machine interactive interface provided when the function of the function module is applied. The application will usually provide the user with an interface for human-machine interaction.

For example, with regard to the WIFI module, the function thereof is to: enable the terminal device to access the Internet, i.e. one can use the terminal device to access the Internet. However, in order to be able to access the Internet, only the WIFI module is not enough, applications, such as a web-browser, an instant messenger and the like, are also required. Therefore, for the WIFI module, the web-browser or the instant messenger is equivalent to the application corresponding to the function of the function module.

In other words, although the hardware support is needed when the various functions of the terminal device are used, objects operated practically by the user are usually software products at different application layers. In the embodiments of the present invention, the implementation of the functions of the function modules comprises enabling of the function modules or invoking of the applications corresponding to the function modules to show operation interfaces for the functions corresponding to the function modules to the user.

Therefore, in the embodiments of the present invention, there are multiple specific meanings for the second instruction. In particular, when the second instruction within the second instruction set corresponding to the first input is determined in the unlocked state, there are also multiple meanings for the second instruction, and they will be discussed below.

Implementation 1

In this implementation, it is assumed that each function module is in an active state when the terminal device is in the locked state. Only softwares corresponding to respective function modules are turned off in the locked state. In a specific implementation, correspondences between first inputs and respective function modules may be preset. In this way, after a first input is received, a function module corresponding to the first input may be first determined based on the first input. Then, an invoking instruction for invoking an application corresponding to the function module is determined as a second instruction. In this way, when the second instruction is responded to, the application may be invoked directly, and it is equivalent to displaying an operation interface of a corresponding function of the function module, and the user may directly use this operation interface to achieve the corresponding function.

When setting the correspondences between the first inputs and respective function modules, the correspondences may be set based on the operation types of the first inputs. The operation types may be implemented by a plurality of strings of characters or a plurality of sliding tracks. For example, it is assumed that the terminal device has a touch screen, and in an embodiment, the first input may be a sliding input of the user on the touch screen. In this case, different operation types of the first inputs may be distinguished based on the direction and/or shape of the sliding track. In this way, when setting the correspondences between the first inputs and respective function modules, directions and/or shapes of various sliding tracks may correspond to respective function modules.

Figure 2:
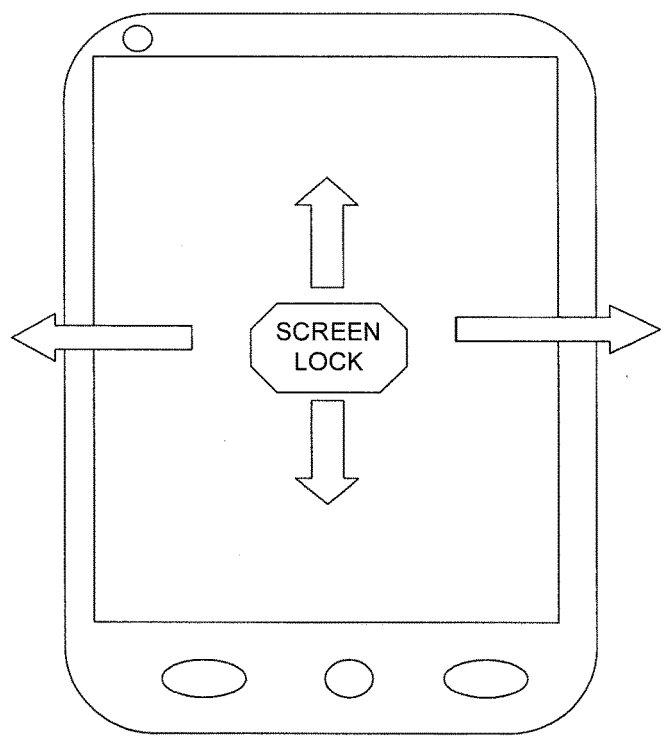
FIG. 2 is a schematic diagram of a screen interface in a method according to an embodiment of the present invention.

For example, as shown in FIG. 2, a screen lock may be displayed on the touch screen in software, and following correspondence is set: dragging the screen lock to the left (equivalent to a sliding track to the left) corresponds to the WIFI module; dragging the screen lock to the bottom (equivalent to a sliding track to the bottom) corresponds to the GSM module; and dragging the screen lock to the right (equivalent to a sliding track to the right) corresponds to the BT module. When a certain first input is received, if it is judged that a user operation of dragging the screen lock to the left is performed, and it is assumed that the preset application corresponding to the WIFI module is the browser, then the corresponding second instruction may be resolved into: invoking the browser. In this way, when the second instruction is responded to, the browser application can be invoked directly to enter the browser interface.

In this way, in the case where the terminal device is in the locked state, the user may enter the browser interface by directly dragging the screen lock to the left. Then, it is very convenient for the user to browse any desired web information by inputting a web link into the browser. In other words, from the perspective of the user, if the user wants to access the Internet with the terminal device and currently the terminal device is in the locked state, then the user may drag the screen lock to the left, and then user may view the browser interface directly after the screen lights and enters the unlocked state. In another embodiment, if the user wants to place a phone call, and it is assumed that the module corresponding to the unlocking operation of dragging the screen lock to the right is the GSM module, then the screen lock may be dragged to the right, and the user may see the dial pad and buttons for looking up in the address book and click on the numbers of the dial pad or look for the contact directly. When the user wants to use the terminal device, it is always true that some function of the terminal device will be used to, such as place a phone call, send an SMS message, or access the Internet. Therefore, the user may perform an unlocking operation of a corresponding type directly to enter a corresponding operation interface directly based on the actual needs. Obviously, as compared with the prior art, processes for user operations are simplified and the intelligence of the terminal device is improved.

It is to be noted that one function module may correspond to a plurality of applications. When a first input of a certain operation type is performed, the application to be invoked actually may be a preset one, or may be varied. For example, for the above example, the application corresponding to the WIFI module may be the browser or the instant messenger, or the like. In the default state, when the screen lock is dragged to the left, the application invoked accordingly may be the browser. However, if the user gets used to chatting with his/her buddies via the terminal device rather than browsing web-pages, then the instant messenger, rather than the browser, is used in most cases. Therefore, the user may manually change the application corresponding to the first input of this operation type into the instant messenger. In this way, when the user performs the first input of dragging the screen lock to the left, the interface of the instant messenger will be displayed to the user.

Figure 3:
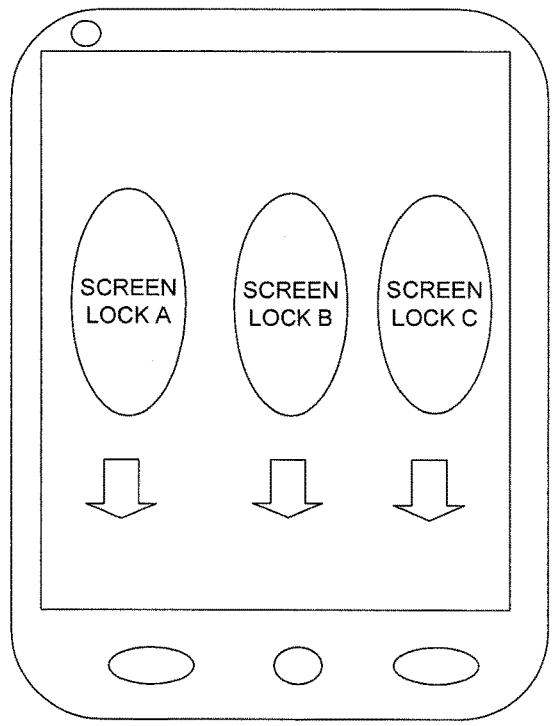
FIG. 3 is a schematic diagram of another screen interface in a method according to an embodiment of the present invention.

Of course, in one implementation, the first input may be an input of clicking or dragging the screen lock on the touch screen on which there are displayed multiple screen locks. In this way, when setting the correspondences between first inputs and function modules, such correspondences can be set by setting correspondences between the screen locks and the function modules. For example, as shown in FIG. 3, three screen locks are displayed on a touch screen, the screen lock A, the screen lock B, and the screen lock C, respectively. Following correspondences are set: the screen lock A corresponds to the WIFI module; the screen lock B corresponds to the CMMB module; and the screen lock C corresponds to the GPS module.

When a first input is received from a user, it is first judged which screen lock is the object of the first input. For example, when it is judged that the screen lock clicked by the user is the screen lock A, a second instruction may be resolved as: invoking the browser. Accordingly, when the second instruction is responded to, a browser program may be invoked directly and a browser interface is entered.

Implementation 2

In Implementation 2, in addition to the convenience of the user operations, the power saving of the terminal device is also accounted for. Currently, most of intelligent terminal devices face the challenge of great power consumption, and for the intelligent terminal devices, the standby time is one of the most important concerns with respect to the performance of the terminal device. However, under the assumption that same battery capacity is used, the standby time of the intelligent terminal device is much shorter than that of the normal non-intelligent terminal device. The reason is that: in addition to the capability of displaying images on a high-definition, large screen supported by the intelligent cell-phone, a very critical reason is that the intelligent terminal device supports various function modules. As described above, in addition to the basic communication function (such as, voice communication), the intelligent terminal device may comprise WIFI, BT, GPS, CMMB, etc. In the prior art, as long as the terminal device is powered on, each function module will be enabled. In other words, each function module is needed to be powered. It is obvious that the enabled function module will cause the increased power consumption of the chipset of the system, which in turn causes a reduced standby time of the intelligent terminal device. Although the standby time may be improved by increasing the battery capacity, such a solution may increase the cost and weight of the terminal device.

In an embodiment of the present invention, the following solution may be employed: when the terminal device is in the locked state, only the basic communication module is remained in the enabled state in order to receive incoming calls or SMS messages, or the like; since other function modules are rarely used in the locked state, these other function modules may be set to a sleep state. Since the modules of the terminal in the sleep state is not required to be powered, the power of the terminal device may be greatly saved in the locked state, the power consumption of the chipset of the system is reduced, and the goal of power saving is achieved.

Of course, since most function modules enter the sleep state in the locked state, if no special processing is performed, some operations are required to be performed to enable a function module (i.e. informing the system of supplying power to the function module) when the user wants to use the function of the function module. However, in an embodiment of the present invention, in order to simplify the user operation, the instruction for enabling a certain function module may also be regarded as an instruction within the second instruction set. In other words, the user may carry out the operation for enabling a certain function module at the same time that the unlocking operation is performed.

With regard to the terminal device, when the first input is received from the user, i.e. when the user wants to perform the unlocking operation, it indicates that the user may want to use some function of the terminal device. At this time, a function module corresponding to the present first input is acquired by using the preset correspondences between the first inputs and the function modules. At this time, the second instruction determined may be: an enable instruction for enabling corresponding function module. To enable the corresponding function module, the second instruction is responded to.

In other words, although most function modules are set to the sleep state in the case where the terminal device is in the locked state, the user does not need to enable a function module manually when the function of the function module is to be used.

Of course, it is also possible that all function modules are enabled when the terminal device is switched from the locked state to the unlocked state. However, in the present embodiment of the present invention, such a case does not occur because: once the function modules are enabled, they will consume the power of the system; and the user usually may not want to use all the function modules, instead, only one or some of the function modules will be used. Therefore, power consumed by those unused, but enabled function modules will be a kind of waste. Therefore, in the embodiment of the present invention, one or more function modules that are needed by the user are enabled when the terminal device is switched from the locked state to the unlocked state while other function modules that are not needed by the user remain in the sleep state. That is, the other function modules are not powered on, to reduce the power consumption.

Based on the above concerns, in an embodiment of the present invention, when a certain first input is performed by the user, the terminal device is switched from the locked state to the unlocked state while only the function module corresponding to the first input is enabled. In this way, the user operation is simplified, the intelligence of the terminal device is improved, and the power consumption of the terminal device is lowered as much as possible and the standby time of the terminal device is lengthened.

Furthermore, with regard to the settings of the correspondences between the first inputs and the function modules, it may be same as Implementation 1, and therefore omitted for simplicity.

Implementation 3

In this implementation, previous Implementation 1 and Implementation 2 may be combined. In other words, when the terminal device enters the locked state, only basic communication module is remained in the enabled state, and other function modules are in the sleep state; meanwhile, the correspondences between the first inputs and the function modules are set. When a certain first input is received, the function module corresponding to the first input is first determined. The enable instruction for enabling the function module and the invoking instruction for invoking the application corresponding to the function module are determined as the second instruction. When the second instruction is responded to, the corresponding function module is first enabled, and then the application corresponding to this function module is invoked, and the operation interface of the corresponding function of the function module is displayed.

Of course, in this implementation, the user operation is further simplified while the power consumption is lowered as much as possible, and therefore the intelligence of the terminal device is further improved.

With respect to the details of Implementation 3 (comprising the settings of the correspondences between the first inputs and the function modules), please refer to above Implementations 1 and 2, and they are omitted for simplicity.

Implementation 4

As discussed hereinbefore, the first inputs may have multiple operation types. For example, the first inputs may be various specified string of characters or various sliding tracks, etc. Any of the first inputs of these forms may be the unlocking instructions. In other words, no matter which operation type of the first input performed by the user is, the terminal device may resolve the first input to be the unlocking authentication, and generate the unlocking instruction after the authentication is passed so as to switch the terminal device from the locked state to the unlocked state. However, since the user may want to achieve a specific function with the terminal device in the unlocked state and there are multiple functions desired by the user, with regard to the first inputs of various operation types, respective second instructions may be different, and with regard to the first inputs of a same operation type, there also may be multiple corresponding second instructions.

From this perspective, when it is required to determine which second instruction within the second instruction set corresponds to the first input in the unlocked state, another implementation may exist: correspondences between different operation types of the first inputs and the second instructions may be set directly. In this way, after the first input is received, the terminal device may determine which instruction or instructions of the second instruction set correspond to the first input by resolving the specific operation type of the first input.

In other words, unlike Implementations 1-3, in Implementation 4, the operation type of the first input corresponds to a specific second instruction directly, rather than to a certain function module. For example, under the assumption that the terminal device has a touch screen, in one implementation, if the first input is a sliding input on the touch screen by the user, different operation types of the first inputs may be distinguished by the directions and/or shapes of the sliding track. In this way, when it is required to determine which second instruction within the second instruction set corresponds to the first input in the unlocked state, an instruction corresponding to a direction and/or shape of a sliding track generated by the sliding input is determined as the second instruction, based on preset correspondences between directions and/or shapes of sliding tracks and respective instructions within the second instruction set, according to the direction and/or shape of the sliding track generated by the sliding input of the user.

For example, in the preset correspondences, when the user operation of sliding to the right corresponds to a kind of second instruction, the user operation of sliding to the left may correspond to another kind of second instruction, and so forth. In this way, after the terminal device is switched to the unlocked state, in the case where the second instruction within the second instruction set corresponding to the first input is to be determined, the direction and/or shape of the sliding track generated by the first input is first determined according to the coordinates of the start point and the end point of the sliding operation. Then, it is determined which instruction or instructions within the second instruction set correspond to the first input according to the preset correspondences between the directions and/or shapes of the sliding tracks and respective instructions within the second instruction set, and the corresponding instruction is responded to.

The second instruction within the second instruction set may be any instruction described in Implementations 1-3. In particular, it may comprise: an invoking instruction for invoking the application corresponding to a function module when the function module is in active state in the case where the terminal device is in the locked state; or an enable instruction for enabling a function module when the function module is in sleep state in the case where the terminal device is in the locked state; or an enable instruction for enabling a function module and an invoking instruction for invoking the application corresponding to the function module when the function module is in sleep state in the case where the terminal device is in the locked state. Furthermore, in the case where the correspondences between the first inputs and the second instructions are preset, these correspondences may be established by setting the correspondences between the operation types of the first inputs and respective function modules. In this way, one first input may correspond to a plurality of second instructions. A screen lock may be displayed on the touch screen in software, and following correspondences may be set: dragging the screen lock to the left (equivalent to generating a sliding track to the left) corresponds to a second instruction of invoking the web-browser application for the WIFI module; dragging the screen lock to the bottom (equivalent to generating a sliding track to the bottom) corresponds to a second instruction of enabling the GSM module; dragging the screen lock to the right (equivalent to generating a sliding track to the right) corresponds to a second instruction of enabling the 3G module and a second instruction of invoking an application for the BT module, etc.

Of course, other correspondences may be set, or other sliding tracks may be set, etc. For example, an L-shaped track may be set, and when the operation type of the first input is an L-shaped track, an application for the CMMB module may be invoked, and so on. Other possible settings will not be enumerated here.

Alternatively, in another implementation, the first input may be an input of clicking or dragging the screen lock on the touch screen on which there are displayed multiple screen locks. In this way, the operation types of the first inputs may be distinguished by operating different screen locks. The screen locks may be achieved in software, and displayed on different positions on the touch screens. In particular, after the terminal device is switched to the unlocked state, when the second instruction within the second instruction set corresponding to the first input is to be determined, it is determined which screen lock corresponds to the first input according to information, such as, the coordinates of the position of the user's clicking, and then it is determined which instruction or instructions within the second instruction set correspond to the first input according to the preset correspondences between the screen locks and the respective instructions within the second instruction set. Then, the corresponding instruction is responded to.

Also, in a specific implementation, when the correspondences between the operation types of the first inputs and the second instructions are preset, the correspondences can be established by setting the operation types of the first inputs and the function modules. For example, three screen locks may be displayed on the touch screen, the screen lock A, the screen lock B, and the screen lock C, respectively. Following correspondences are set: the second instruction corresponding to clicking the screen lock A is to enable the GSM module, the 3G module, and the WIFI module, and to invoke the web-browser application for the WIFI module; the second instruction corresponding to dragging the screen lock B is to enable the 3G module and the CMMB module, and to invoke an application for the CMMB module; and the second instruction corresponding to clicking the screen lock C is to enable the GPS module and the GSM module, and to invoke an application for the GPS module, or the like.

Therefore, in the embodiment of the present invention, first inputs of different operation types may correspond to different second instructions. In this way, when the user wants to use a function corresponding to a function module, he/she may achieve the function by performing a first input of the corresponding operation type without looking for the corresponding function module in a specific directory after the unlocking operation is done.

In another embodiment of the present invention, one first input performed by the user in the locked state may correspond to two instructions; thereby the intelligence of the terminal device is improved. However, in the previous embodiments, after the first input is acquired in the locked state, the first instruction within the first instruction set corresponding to the first input is first determined, and the first instruction is responded to and the unlocked state is entered. Then the second instruction within the second instruction set corresponding to the first input is determined, and the second instruction is responded to in the unlocked state. However, in the present embodiment of the present invention, both of the first instruction and the second instruction corresponding to the first input may be determined in the locked state, and the first input instruction is responded to in the locked state and the second instruction is responded to in the unlocked state. In other words, when the terminal device is in the locked state, both of the instructions corresponding to the first input are resolved. One of the instructions is responded to when the terminal device is in the locked state, while the other is responded to when the terminal device is in the unlocked state.

Figure 4:
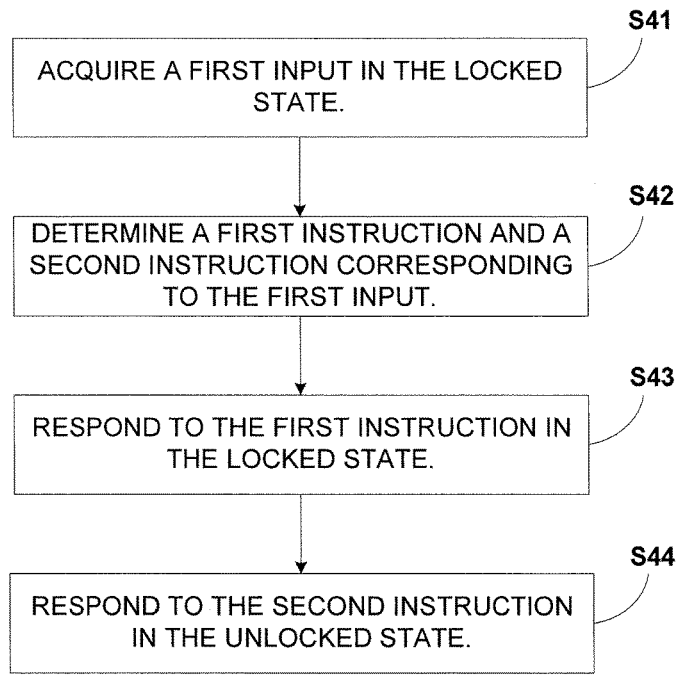
FIG. 4 is a flow chart of another method according to an embodiment of the present invention.

Therefore, referring to FIG. 4, a method for controlling a terminal device according to an embodiment of the present invention comprises steps of:

S41: acquiring, in the locked state, a first input;

S42: determining a first instruction and a second instruction corresponding to the first input, wherein the first instruction belongs to the first instruction set and the second instruction belongs to the second instruction set;

S43: responding, in the locked state, to the first instruction; and

S44: responding, in the unlocked state, to the second instruction.

In the present embodiment, the definitions of the first instruction set, the second instruction set, the first instruction, and the second instruction may be same as the previous embodiments. For example, the first instruction may be an unlocking instruction, and responding to the first instruction in the locked state refers to: controlling the terminal device to be switched from the locked state to the unlocked state according to the unlocking instruction. The second instruction may refer to an invoking instruction for invoking an application corresponding to a function module. At this time, when the second instruction is responded to in the unlocked state, it is first judged whether the function module is enabled or not. If it is enabled, the application corresponding to the function module is invoked directly; if it is not, the function module is first enabled, and then the application corresponding to the function module is invoked. Of course, in other embodiments, the second instruction may be an instruction for enabling a function module, etc.

With regard to the above embodiments, the correspondences between the first inputs and the function modules or the correspondences between the first inputs and the second instructions or the like may be same or similar to the methods in the previous embodiments. For the part which is not described in details, the above embodiments may be also referred to, and it will be omitted for simplicity.

Figure 5:
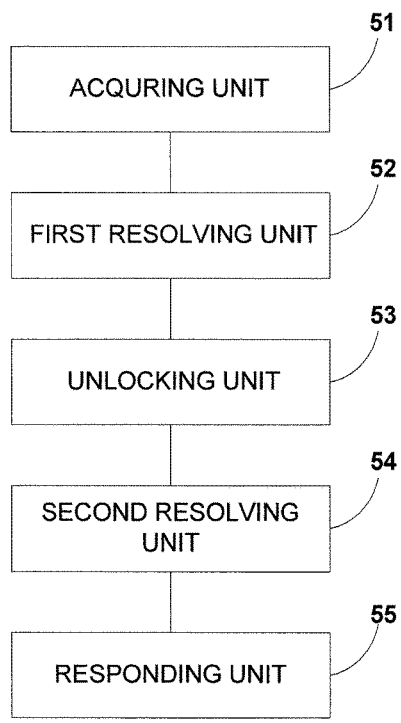
FIG. 5 is a schematic diagram of a terminal device according to an embodiment of the present invention.

According to an embodiment of the present invention, there is further provided a terminal device. The terminal device has a full instruction set, and the terminal device has a locked state in which the terminal device responds to a first instruction set which is a first portion of the full instruction set and an unlocked state in which the terminal device responds to a second instruction set which is a second portion of the full instruction set. The number of instructions in the first instruction set is lower than the number of instructions in the second instruction set. Referring to FIG. 5, the terminal device comprises:

an acquiring unit 51 configured for acquiring a first input;

a first resolving unit 52 configured for determining, in the locked state, a first instruction of the first instruction set corresponding to the first input, the first instruction being an unlocking instruction;

an unlocking unit 53 configured for controlling a switching from the locked state to the unlocked state according to the unlocking instruction;

a second resolving unit 54 configured for determining, in the unlocked state, a second instruction of the second instruction set corresponding to the first input; and a responding unit 55 configured for responding to the second instruction.

In an embodiment, the second resolving unit 54 may further comprise:

a first function module determining sub-unit configured for determining a function module corresponding to the first input according to the first input, wherein the function module is in an active state when the terminal device is in the locked state; and a first determining sub-unit configured for determining an invoking instruction for invoking an application corresponding to the function module as the second instruction.

In the case where the power saving of the terminal device is accounted for, the second resolving unit 54 may comprise:

a second function module determining sub-unit configured for determining a function module corresponding to the first input according to the first input, wherein the function module is in a sleep state when the terminal device is in the locked state; and a second determining sub-unit configured for determining an enable instruction for enabling the function module as the second instruction.

Alternatively, if the above two embodiments are combined, the second resolving unit 54 may comprise:

a third function module determining sub-unit configured for determining a function module corresponding to the first input according to the first input, wherein the function module is in a sleep state when the terminal device is in the locked state; and a third determining sub-unit configured for determining an enable instruction for enabling the function module and an invoking instruction for invoking an application corresponding to the function module as the second instructions.

In practical, the terminal device has a touch screen, and the first input comprises a sliding input on the touch screen; and wherein the second resolving unit 54 may comprise:

a fourth determining sub-unit configured for determining an instruction corresponding to a direction and/or shape of a sliding track generated by the sliding input as the second instruction, based on preset correspondences between directions and/or shapes of sliding tracks and respective instructions within the second instruction set, according to the direction and/or shape of the sliding track generated by the sliding input.

Alternatively, the terminal device has a touch screen, and the first input comprises an input of clicking or dragging a screen lock on the touch screen on which there are displayed a plurality of screen locks; and wherein the second resolving unit 54 comprises:
a fifth determining sub-unit configured for determining an instruction corresponding to the clicking or dragging of the screen lock as the second instruction, based on preset correspondences between screen locks and respective instructions within the second instruction set, according to the clicking or dragging of the screen lock.

Figure 6:
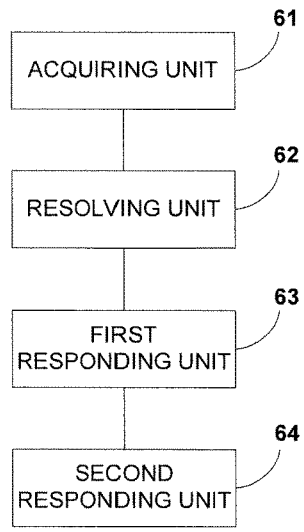
FIG. 6 is a schematic diagram of another terminal device according to an embodiment of the present invention.

According to an embodiment of the present invention there is provided a terminal device. The terminal device has a full instruction set, and the terminal device has a locked state in which the terminal device responds to a first instruction set which is a first portion of the full instruction set and an unlocked state in which the terminal device responds to a second instruction set which is a second portion of the full instruction set. The number of instructions in the first instruction set is lower than the number of instructions in the second instruction set. Referring to FIG. 6, the terminal device comprises:
an acquiring unit 61 configured for acquiring, in the locked state, a first input;
an resolving unit 62 configured for determining a first instruction and a second instruction corresponding to the first input, wherein the first instruction belongs to the first instruction set and the second instruction belongs to the second instruction set;
a first responding unit 63 configured for responding, in the locked state, to the first instruction; and
a second responding unit 64 configured for responding, in the unlocked state, to the second instruction.

With regard to the terminal device introduced in the above embodiments, please refer to above method embodiments for the part which is not described in details and be omitted for simplicity.

In an embodiment of the present invention, there is further provided a method for switching states. This method is applied in an electronic device. The electronic device has a locked state and an unlocked state. To better understand the embodiment of the present invention, the locked state and the unlocked state will be explained below.

In general, the electronic device has a full instruction set. In the locked state, the electronic device responds to a first instruction set which is a first portion of the full instruction set. In the unlocked state, the terminal device responds to a second instruction set which is a second portion of the full instruction set. The number of instructions in the first instruction set is lower than the number of instructions in the second instruction set.

That is to say, the electronic device in the locked state may respond to a portion of instructions. In other words, the locked state refers to a state in which the electronic device may respond to only an instruction within the first instruction set. The instructions within the first instruction set comprise communication prompt instructions (for example, an incoming call prompt instruction, an SMS prompt instruction, etc.), timing reminding instructions (for example, an alarm clock, a memo, etc.), unlocking authentication, unlocking instructions, or the like. When the electronic device is in the locked state, the electronic device may be switched from the locked state to the unlocked state by executing an unlocking instruction. It should be noted that, in the locked state, an unlocking authentication may be generated, and unlocking authentication information is received. If the unlocking authentication is passed, an unlocking instruction is generated. The unlocking authentication may be authentication for a predetermined string of characters, a predetermined track of touches, or a predetermined biometric feature. That is to say, the unlocking authentication is used to prompt the user to input information for the unlocking authentication, and the unlocking instruction is used to switch the electronic device from the locked state to the unlocked state.

The electronic device in the unlocked state may also respond to a portion of the instructions, while this portion of the instructions may be almost all instructions within the full instruction set. For example, it may comprise placing calls, accessing local data, accessing local networks, or the like. It may also comprise the instructions which may be responded to in the locked state, such as the communication prompts, timing reminding, etc.

Therefore, the electronic device in the locked state and in the unlocked state may respond to a portion of the instructions, respectively. If the instructions which may be responded to in the locked stated constitute a first instruction set, and the instructions which may be responded to in the unlocked stated constitute a second instruction set, the intersection of the first instruction set and the second instruction set is usually non-empty. Furthermore, since almost all of the instructions which may be responded to in the locked state can be responded to in the unlocked state, and some instructions which may be responded to in the unlocked state cannot be responded to in the locked state, the number of instructions within the second instruction set is typically lower than that within the first instruction set.

Figure 7:
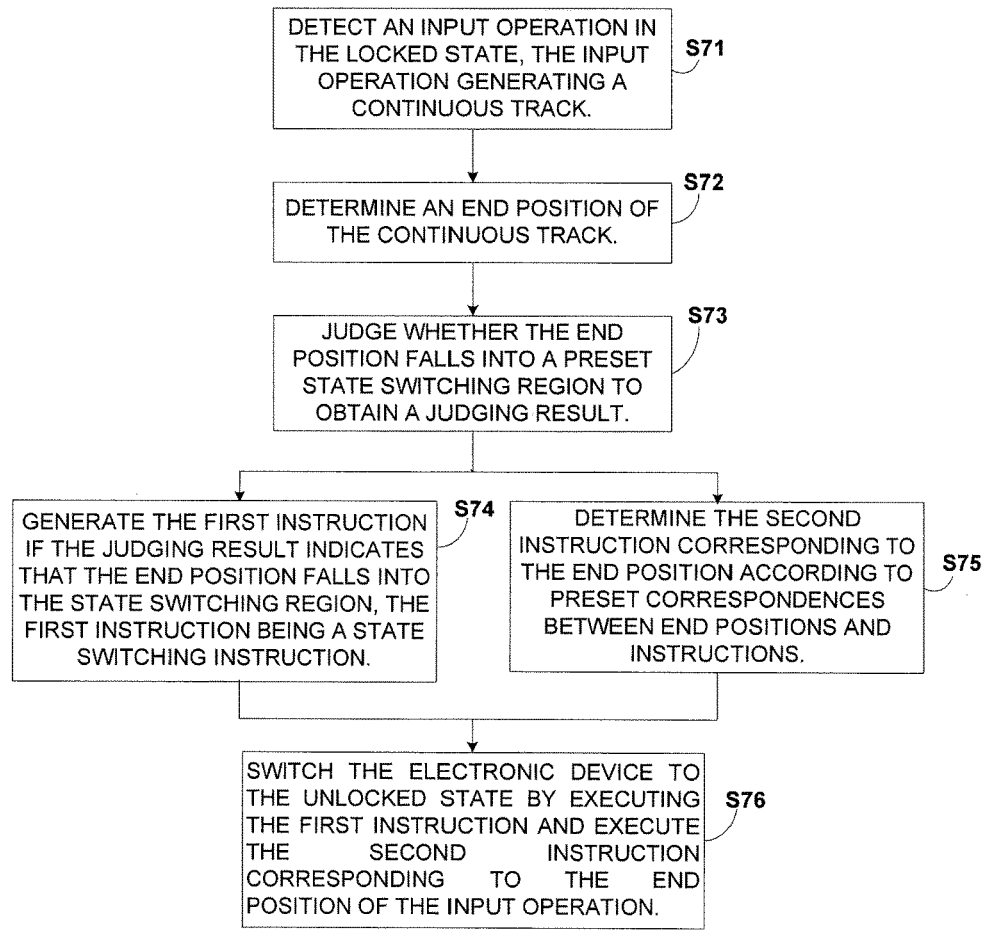
FIG. 7 is a flow chart of a method according to an embodiment of the present invention.

Referring to FIG. 7, the method for switching states according to the embodiment of the present invention may comprise steps of:
S71: detecting, in the locked state, an input operation, the input operation generating a continuous track;
This input operation may be a user input operation when the electronic device is in the locked state, and may be a kind of unlocking authentication operation. In an embodiment of the present invention, this input operation may refer to an operation that can generate a continuous track. For example, an operable indicator may be dragged by using a mouse, or a sliding track is drawn by dragging an operable indicator on the touch screen with a finger or a stylus, or the like.
S72: determining an end position of the continuous track;
For a continuous track, it must have a start position and an end position. In an embodiment of the present invention, after an input operation which generates a continuous track is detected, the end position of the continuous track generated by the operation may be first determined.
S73: judging whether the end position falls into to a preset state switching region to obtain a judging result;
Usually, to determine whether the user intends to perform an unlocking operation, a state switching region is set in the operation region, and the input operation will be treated as an unlocking operation only when the end position of the continuous track generated by the input operation falls into the state switching region.
S74: generating the first instruction if the judging result indicates that the end position falls into the state switching region, the first instruction being a state switching instruction.
If the end position falls into the state switching region, it indicates that the user does really intend to perform the state switching operation, and therefore a state switching instruction is generated.
S75: determining the second instruction corresponding to the end position according to preset correspondences between end positions and instructions.

When the state switching instruction is generated, the second instruction corresponding to the current end position may be determined according to the preset correspondences between the end positions and the instructions. In this case, the second instruction is an instruction that can be responded to in the unlocked state. That is to say, in an embodiment of the present invention, after an input operation is detected in the locked state, if this input operation is regarded as an unlocking operation, then it does not only correspond to the unlock instruction within the first instruction set, but also to a second instruction within the second instruction set. In a specific implementation, the correspondences between the end positions of the input operations and the second instructions may be preset. It should be noted that, in an embodiment of the present invention, both of the first instruction generated at the step S74 and the second instruction determined at the step S75 are determined based on the input operation acquired at the step S71. In other words, when an operating subject finishes the input operation at the electronic device, the electronic device acquires a continuous track corresponding to the input operation, and the first instruction is determined in the locked state according to the track corresponding to the input operation, and the second instruction is determined in the unlocked state according to the track corresponding to the input operation as well.

It should be noted that, in an embodiment of the present invention, there are multiple end positions. In this case, the state switching region is divided into a plurality of smaller regions, and different regions may correspond to different second instructions, respectively. In other words, as long as the end position of the input operation falls into the state switching region, then the state switching instruction may be generated. However, depending on the specific end position, different second instructions may be generated. For example, these different second instructions may be instructions for launching different applications, or different second instructions may be instructions for launching a same application with different operating objects/parameters. In other words, different end positions may correspond to different applications, or to a same application with different operating objects/parameters. In the former case, the second instruction may be used only for launching an application corresponding to the end position (such as, launching a browser, launching a music player, etc.). In the latter case, the second instruction not only launches an application, but also specifies the operating objects/parameters for the application (such as, view a certain web page with the browser, playing certain music with the music player, checking a certain contact within the address book, or the like).

That is to say, in an embodiment of the present invention, multiple different end positions may be preset. The user may choose the service he/she needs by selecting different end positions of the input operation. To facilitate the user's s operations, prompt indicators for various candidate end positions may be provided to the user. For example, with regard to the electronic products with touch screens, an operable indicator (for example, sliding blocks) may be preset. After the user activates the screen, the operable indicator may be displayed at a certain position on the screen. After that, the user may drag the operable indicator to another position to perform the unlocking operation. However, in an embodiment of the present invention, in addition to displaying an operable indicator to the user, multiple end positions for the user to choose may be also displayed. Further, the names of the various different applications or the names of the different operating objects/parameters for a same application may be displayed at the respective end positions. In this way, if the user wants to launch an application or operate an operating object/parameter for a to-be-launched or launched application while the unlocking operation is performed, the operable indicator may be dragged to respective corresponding end positions.

Figure 8:
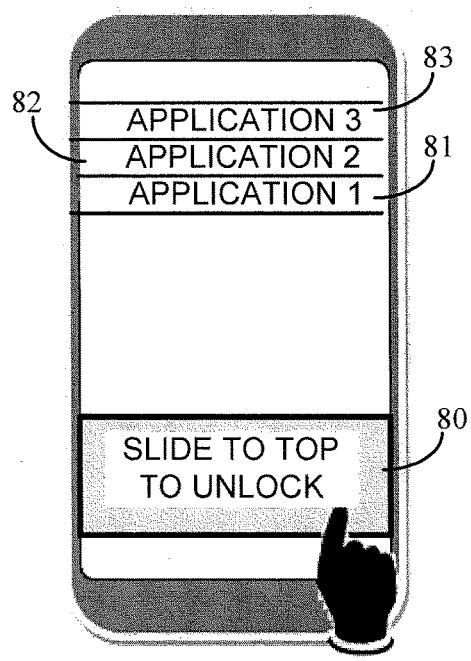
FIG. 8 is a schematic diagram of a first interface in a method according to an embodiment of the present invention.

For example, in an embodiment of the present invention, after the user activates the screen, as shown in FIG. 8, 80 denotes the operable indicator, and 81, 82, and 83 are respective end positions. The names of the different applications are displayed at respective different end positions, for example, "Application 1," "Application 2," and "Application 3," respectively. In this way, if the user wants to launch "Application 1," then he/she may drag the operable indicator 80 to the end position 81. In this way, after unlocking, the interface for "Application 1" is entered directly. For example, "Application 1" is "the address book," and the interface for the address book, rather than the interface for the main menu, is entered after unlocking. Similarly, if the user wants to launch "Application 2" or "Application 3," he/she may drag the operable indicator 80 to the end positions 82 or 83, respectively.

Figure 9:
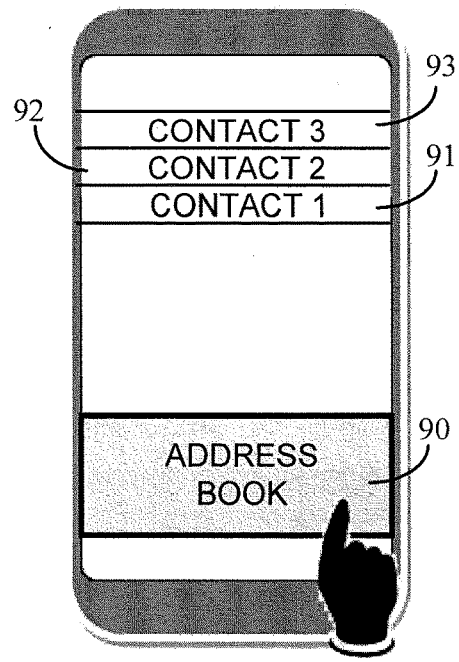
FIG. 9 is a schematic diagram of a second interface in a method according to an embodiment of the present invention.

Furthermore, in an embodiment of the present invention, after the user activates the screen, also shown in FIG. 9, 90 denotes an operable indicator, and 91, 92, and 93 are respective end positions. FIG. 9 differs from FIG. 8 in that the different operating objects/parameters of a same application are displayed at the different end positions, wherein the application may be a commonly used application, such as, the address book shown in FIG. 9. The different operating objects/parameters for the address book may be respective contacts in the address book. Therefore, the names of the respective contacts may be displayed at respective end positions, "Contact 1," "Contact 2," "Contact 3," respectively. Of course, the words "address book" may be displayed directly on the operable indicator. In this way, if the user wants to contact "Contact 1" in the address book, then the operable indicator entitled "address book" may be dragged directly to the end position where "Contact 1" is located. In this way, after the unlocking, the information for "Contact 1" is displayed directly, and then the "Dial" button may be directly pressed to perform operations, such as, placing a phone call. Also, if the user wants to contact "Contact 2" or "Contact 3," then the operable indicator may be dragged to respective positions, respectively.

That is to say, in practical usage, after the user unlocks the electronic device, he/she must want to be provided with some service via the electronic device. With the methods of the embodiments of the present invention, steps for looking for applications in the main menu manually can be omitted, and steps for looking for specific operating objects/parameters in a specific application may also be omitted.

It should be noted that, in practical, there may be numerous applications for the electronic device while the number of candidate end positions may be limited, and not every application can correspond to one end position. In this case, a portion of the applications may be selected to correspond to respective end positions according to some factors, such as the practical usage of the user. Alternatively, a portal for setting may be provided, and the user may set the applications corresponding to respective end positions manually as required. Similarly, there may be numerous operating objects/parameters for a same application. For example, there may be tens or hundreds contacts in the address book. In this case, frequent contacts may be selected to correspond to respective end positions. Alternatively, a portal for setting may be also provided to the user in order to set which application is the application launched after the unlocking, and to set which operating objects/parameters correspond to the end position. All these correspondences may be set by the user as required. Of course, another operable indicator may be provided to not affect the user in operating other applications or other operating objects/parameters for the application, and such an operable indicator may be displayed along with the words "Basic Unlocking." This operable indicator achieves the function of unlocking only, and the state switching instruction may be generated and the electronic device is switched to the unlocked state once the operable indicator is dragged into the state switching region.

Hereinbefore, an implementation of the embodiment of the present invention is introduced. In this implementation, multiple candidate end positions are provided for the input operations of the user. With different end positions, different second instructions are determined. In practical, multiple start positions may be provided for the input operations of the user and each start position corresponds to multiple end positions. In this way, when the second instructions corresponding to different end positions are determined, the start position of the continuous track should be first determined. Then, based on the start position, the second instruction corresponding to the end position is determined. In this case, different start positions may correspond to different applications, and different end positions may correspond to different operating objects/parameters for the corresponding application. For example, let's take the electronic device with the touch screen as another example. Different start positions may be provided by providing multiple different operable indicators, and each operable indicator may correspond to a different application. When the user wants to launch an application, he/she may drag the operable indicator corresponding to the application. Accordingly, each operable indicator may correspond to multiple end positions. When the user wants to operate an operating object/parameter for the application, he/she may drag the corresponding operable indicator for the application to the position where the operating object/parameter is located. Also, to facilitate the user's operations, the names of the respective applications may be displayed on respective operable indicators, and the names of the respective operating objects/parameters may be displayed at respective end positions.

It should be noted that different operable indicators may share a same end position. In other words, for an end position within the state switching region, when the operable indicator corresponding to Application 1 is dragged, the end position corresponds to an operating object/parameter A for Application 1; when the operable indicator corresponding to Application 2 is dragged, the end position corresponds to an operating object/parameter B for Application 2. Therefore, in specific implementations, it may be displayed as follows: after the user activates the screen, respective operable indicators at respective start positions are displayed, and the names of the respective applications are displayed on the respective operable indicators; when the user begins the input operation, it is determined which operating objects/parameters are to be displayed at the end position and where they are displayed according to the operable indicator selected by the user, and respective operating objects/parameters are displayed at respective positions for displaying. In other words, since the operable indicator selected to be dragged by the user corresponds to the start position of the continuous track, this process is equivalent to: determining, in the locked state, positions for displaying, within the state switching region, at least two operating objects/parameters of the application corresponding to the start position according to the start position of the continuous track; and displaying the at least two operating objects/parameters at the respective positions within the state switching region as candidate end positions.

For example, as shown in FIG. 10A, 101, 102, and 103 are three operable indicators, and correspond to "browser," "address book," and "player," respectively. After the user activates the screen, it is shown as FIG. 10A. After that, the user begins to perform an unlocking operation. Under the assumption that the user wants to launch "address book," the operable indicator 102 corresponding to "address book" is dragged. After the user selects the operable indicator, respective operating objects/parameters for the application "address book" are displayed at respective candidate end positions. For example, as shown in FIG. 10, six end positions are displayed, and "Contact 1," "Contact 2," . . . , "Contact 6" are displayed at respective end positions. At the same time, to prompt the user better, a prompt, such as "slide to your contacts," is displayed at a blank region. At this time, if the user wants to contact one of the contacts, he/she may drag the operable indicator 102 corresponding to the "address book" application to the position where the contact is located. In a same way, processing for other applications is similar, and omitted for simplicity.

Figure 10A:
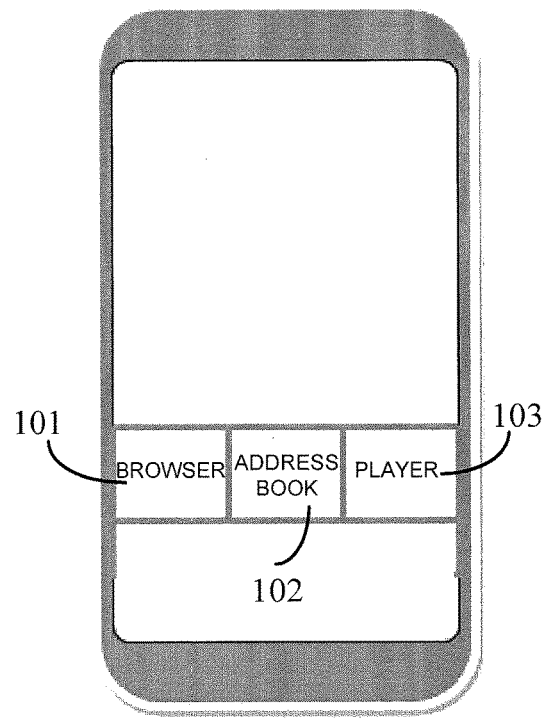
FIG. 10A is a schematic diagram of a third interface in a method according to an embodiment of the present invention.
Figure 10B:
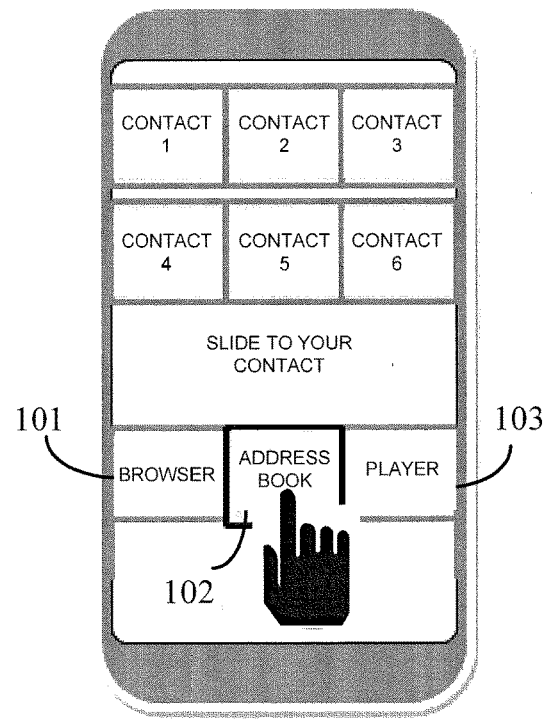
FIG. 10B is a schematic diagram of a fourth interface in a method according to an embodiment of the present invention.

It should be noted that, in the above FIGS. 10A and 10B, various operable indicators are displayed in a row. In this case, the display region for each operable indicator may be relatively small. As shown in FIGS. 10A and 10B, the display region occupied by each operable indicator is a square-like region. Of course, the display region for each end position may also be matched with the display region for the operable indicator. As shown in FIG. 10B, each end position occupies one square-like display region also, and its area is approximately as large as that occupied by the operable indicator. Of course, in this case, when the user wants to operate an operable indicator, the region for operating may be limited.

Therefore, in an embodiment of the present invention, to facilitate the user's operations, the display layout for operable indicators may be adjusted during the operations, and the display regions for the end positions may be determined based on the result of the adjustment. For example, after the interface as shown in FIG. 4 is displayed, if an operable indicator is selected, then the display region corresponding to the operable indicator is enlarged, and the end positions where respective operating objects/parameters are located are displayed according to the enlarged display region for the operable indicator. For example, under the consumption that the operable indicator "address book" is clicked by the user, its display region may be enlarged as shown in FIG. 9, and the display region for the corresponding end position may be adjusted accordingly as shown in FIG. 9.

Figure 11:
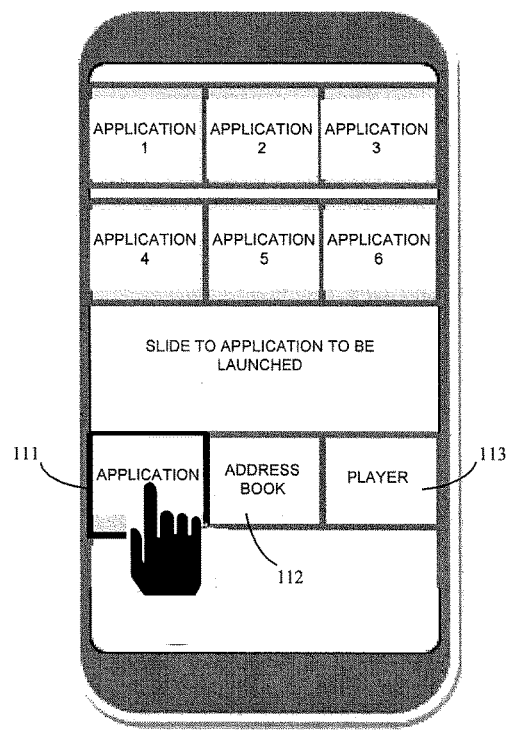
FIG. 11 is a schematic diagram of a fifth interface in a method according to an embodiment of the present invention.
Figure 12:
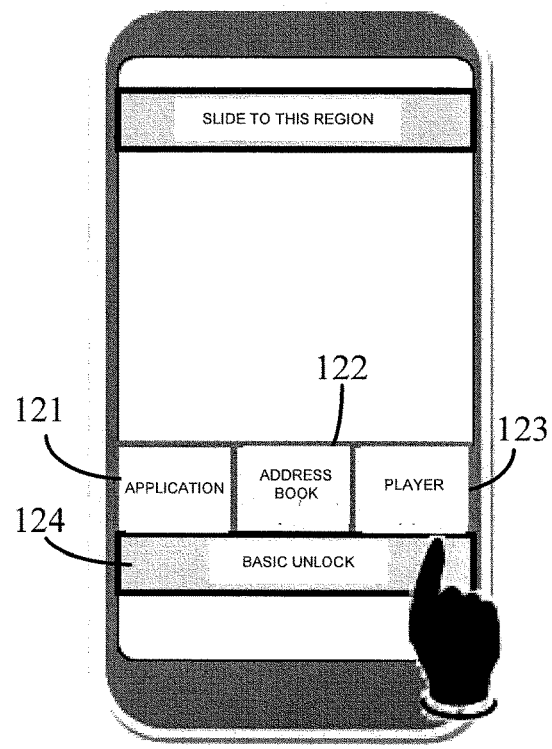
FIG. 12 is a schematic diagram of a sixth interface in a method according to an embodiment of the present invention.

It should be also noted that, in the case of multiple operable indicators, as described above, a setting portal may be provided to the user. The user may set that which application corresponds to respective operable indicators and which operating object/parameter corresponds to respective end positions, as required. Furthermore, in the case of multiple operable indicators, each operable indicator may not have to correspond to a specific application. Instead, an operable indicator may be set to correspond to a set of applications. In other words, this operable indicator may be marked as "applications," and when this operable indicator is dragged, the names for respective applications may be displayed at the end positions. For example, as shown in FIG. 11, displayed on the operable indicator 111 is "Applications," and displayed on the other two operable indicators 112, 113 are two specific applications, "address book" and "browser," respectively. When the operable indicator 111 is dragged, the specific applications, such as "Application 1," "Application 2," are displayed at the end positions. Furthermore, there may be also an operable indicator for the basic unlocking operation. When no other operable indicator can be used for finding the application or service desired by the user, the electronic device may be switched to the unlocked state by dragging the operable indicator for the base unlocking. As shown in FIG. 12, 124 is the operable indicator for the base unlocking operation (121, 122, 123 are same as 111, 112, 113 in FIG. 11), "Basic Unlocking" is displayed thereon in order to be distinguished from other operable indicators.

S76: switching the electronic device to the unlocked state by executing the first instruction and executing the second instruction corresponding to the end position of the input operation.

After the first instruction is determined to be the state switching instruction and the corresponding second instruction in the unlocked state is determined, the first instruction is first executed, and the electronic device is switched to the unlocked state, and then the second instruction is executed to display to the user the interface after the second instruction has been executed.

In summary, in the embodiments of the present invention, multiple different candidate end positions may be provided for the input operations of the user, and is different instructions in the unlocked state may correspond to different end positions. In this way, when the user is performing the unlocking operation, not only the electronic device can be switched to the unlocked state, but also an instruction in the unlocked state (for launching an application or operating objects/parameters for an application, etc.) may be directly executed. Therefore, the user's operations for looking up in abundant information are reduced, and the intelligence of the electronic device is improved.

Figure 13:
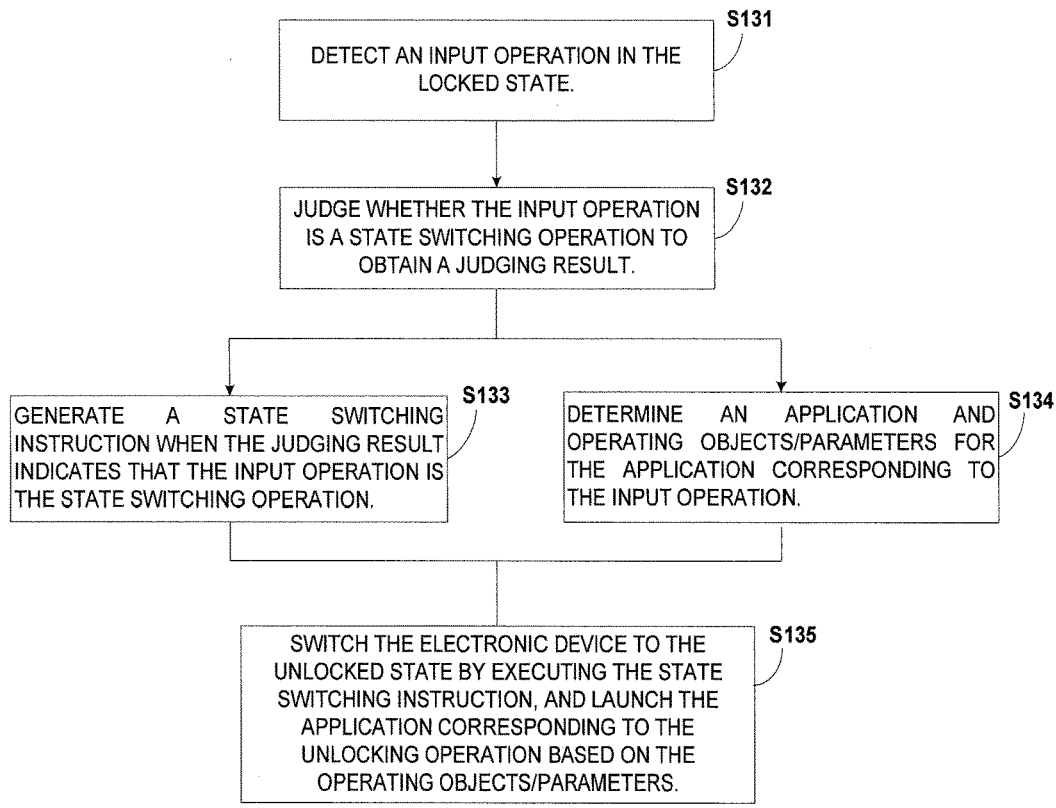
FIG. 13 is a flow chart of another method according to an embodiment of the present invention.

Referring to FIG. 13, an embodiment of the present invention provides another method for switching states, and this method for switching state is also applied in an electronic device. This electronic device also has an locked state and an unlocked state. The definitions of the locked state and the unlocked state are same as above, and will be omitted for simplicity. The method comprises steps of:

S131: detecting, in the locked state, an input operation;

This input operation may be an input operation of a user when the terminal device is in the locked state, and may be an unlocking authentication operation. In an embodiment of the present invention, this input operation may be pressing a certain key or key combination, or dragging an operable indicator with a mouse, or dragging an operable indicator on the touch screen with a finger or a stylus, and so forth.

S132: judging whether the input operation is a state switching operation to obtain a judging result;

Rules for state switching operations may be preset. If the input operation belongs to the rules, then it may be judged to be a state switching operation. For example, the key or key combination pressed by the user belongs to a preset key or key combination for unlocking, or a track formed by a sliding operation performed by the user meets a certain requirement in length, and so forth.

S133: generating a state switching instruction when the judging result indicates that the input operation is the state switching operation;

If it is judged that the user is performing an unlocking operation, a state switching instruction is generated.

S134: determining an application and operating objects/parameters for the application corresponding to the input operation;

After it is judged that the user is performing the unlocking operation, in an embodiment of the present invention, the application and the operating objects/parameters for the application corresponding to the user's input operation is needed to be determined.

S135: switching the electronic device to the unlocked state by executing the state switching instruction, and launching the application corresponding to the unlocking operation based on the operating objects/parameters.

That is to say, in an embodiment of the present invention, after the user performs the unlocking operation, not only the unlocking operation is to be performed, but also the application to be launched after switching to the unlocked state and the operating objects/parameters for the application are to be determined. After the specific application and the operating objects/parameters for the application are determined, an instruction may be generated. The instruction belongs to the second instruction set which may be executed in the unlocked state. The launching of the application corresponding to the unlocking operation based on the operating objects/parameters may be achieved by executing the instruction.

There are multiple specific methods for determining the application and the operating objects/parameters for the application corresponding to the user's input operation. For example, in an implementation, if the input operation generates a continuous track, the corresponding application may be determined according to the start position of the continuous track, and the operating objects/parameters for the application may be determined according to the end position of the continuous track. To facilitate the user's operations, positions for displaying, within the state switching region, at least two operating objects/parameters of the application corresponding to the start position are determined in the locked state according to the start position of the continuous track. Then, the at least two operating objects/parameters are displayed at the respective positions within the state switching region as candidate end positions. Please refer to the above embodiment for details of the specific method for implementing, and no description will be given here for simplicity.

Figure 14:
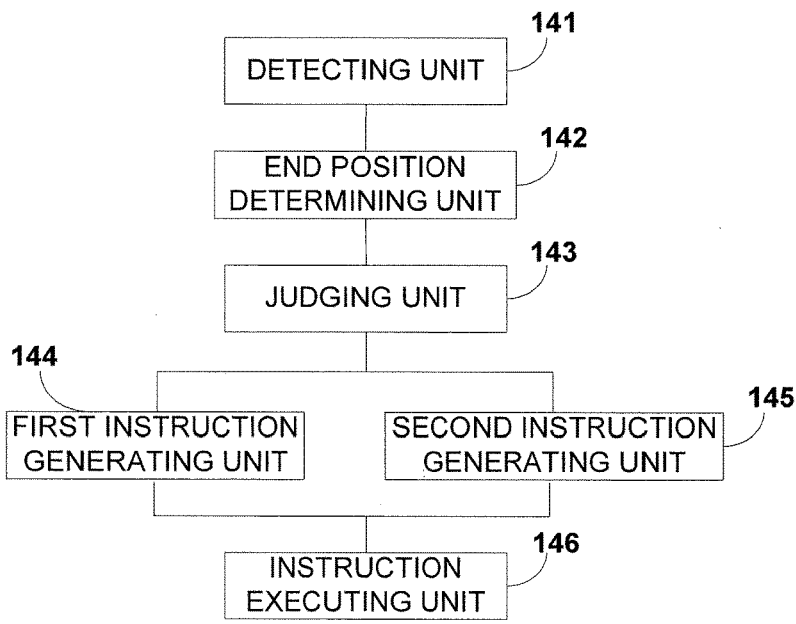
FIG. 14 is a schematic diagram of an apparatus according to an embodiment of the present invention.

According to an embodiment of the present invention there is provided an apparatus for switching states, and this apparatus is applied in an electronic device. The electronic device has a locked state and an unlocked state. Referring to FIG. 14, the apparatus comprises:

a detecting unit 141 configured for detecting, in a locked state, an input operation, the input operation generating a continuous track;

an end position determining unit 142 configured for determining an end position of the continuous track;

a judging unit 143 configured for judging whether the end position falls into a preset state switching region to obtain a judging result;

a first instruction generating unit 144 configured for generating a first instruction when the judging result indicates that the end position falls into the state switching region, the first instruction being a state switching instruction;

a second instruction determining unit 145 configured for determining a second instruction corresponding to the end position according to preset correspondences between end positions and instructions; and an instruction executing unit 146 configured for switching the electronic device into the unlocked state by executing the first instruction, and executing the second instruction corresponding to the end position of the input operation.

In a specific implementation, the apparatus may further comprise:

a start position determining unit configured for determining a start position of the continuous track;

accordingly, the second instruction determining unit 145 is further configured for: determining the second instruction corresponding to the end position, based on the start position, according to preset correspondences between end positions and instructions.

wherein different start positions may correspond to different applications, and different end positions related to a same start position correspond to different operating objects/parameters for the application, and the second instruction determining unit 145 is further configured for: determining the second instruction according to an application corresponding to the start position and operating objects/parameters corresponding to the end position.

To facilitate the user's operations, the apparatus may further comprise:

a display position determining unit configured for determining, in the locked state, positions for displaying, within the state switching region, at least two operating objects/parameters of the application corresponding to the start position according to the start position of the continuous track; and a display unit configured for displaying the at least two operating objects/parameters at the respective positions within the state switching region as candidate end positions.

In correspondence with the state switching apparatus, an embodiment of the present invention provides an electronic device comprising a processing module, a display module, and an input module, wherein the display module is configured for displaying information to a user, the input module is configured for receiving an input operation of the user, and the processing module is configured to comprise a state switching apparatus as described in Embodiment 3.

It should be noted that: in an embodiment of the present invention, the input module may be devices, such as, a mouse, a keyboard, or a touch screen. In the case where the input module is a touch screen, the input module is integrated with the display module.

Figure 15:
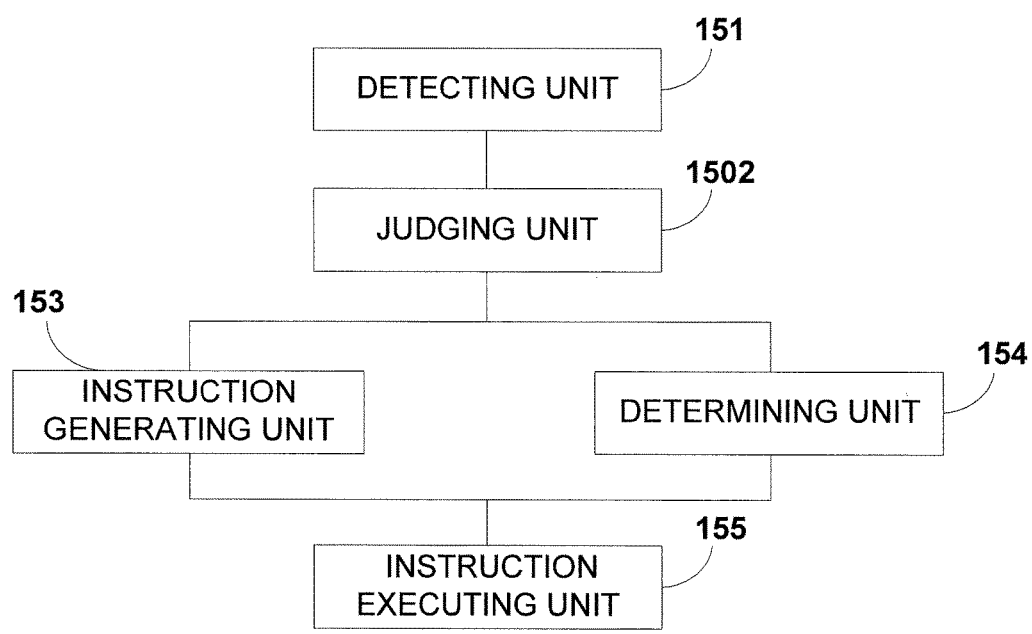
FIG. 15 is a schematic diagram of another apparatus according to an embodiment of the present invention.

According to an embodiment of the present invention there is provided another apparatus for switching states, and this state switching apparatus is applied in an electronic device. The electronic device has a locked state and an unlocked state. Referring to FIG. 15, the apparatus comprises:

a detecting unit 151 configured for detecting, in the locked state, an input operation;

a judging unit configured 152 for judging whether the input operation is a state switching operation to obtain a judging result;

an instruction generating unit 153 configured for generating a state switching instruction when the judging result indicates that the input operation is the state switching operation;

a determining unit 154 configured for determining an application and operating objects/parameters for the application corresponding to the input operation;

an instruction executing unit 155 configured for switching the electronic device to the unlocked state by executing the state switching instruction, and launching the application corresponding to the unlocking operation based on the operating objects/parameters.

The input operation generates a continuous track. Accordingly, the determining unit 154 is further configured for determining the corresponding application according to the start position of the continuous track, and determining the corresponding operating objects/parameters for the application according to the end position of the continuous track.

To facilitate the user's operations, the apparatus may further comprise:

a display position determining unit configured for determining, in the locked state, positions for displaying, within the state switching region, at least two operating objects/parameters of the application corresponding to the start position according to the start position of the continuous track; and a display unit configured for displaying the at least two operating objects/parameters at the respective positions within the state switching region as candidate end positions.

Furthermore, according to an embodiment of the present invention there is provided an electronic device. The electronic device similarly comprises a processing module, a display module, and an input module, wherein the display module is configured for displaying information to a user, the input module is configured for receiving an input operation of the user, and the processing module is configured to comprise a state switching apparatus as described in Embodiment 4.

Also, in an embodiment of the present invention, the input module may be devices, such as, a mouse, a keyboard, or a touch screen. In the case where the input module is a touch screen, the input module is integrated with the display module.

Anyway, with the apparatuses for switching states and the electronic devices according to the embodiments of the present invention, multiple different candidate end positions may be provided for the user's input operations, and different instructions in the unlocked state may correspond to different end positions. In this way, when the user is performing an unlocking operation, not only the electronic device can be switched to the unlocked state, but also a certain instruction comprising launching of a certain application can be executed directly in the unlocked state (even operating objects/parameters for a certain application may be operated). Therefore, operations for finding in massive information by the user are reduced, thereby the intelligence of the electronic device is improved.

It should be noted that embodiments of the apparatus for switching states and the electronic device correspond to those of the above methods for switching states, and please refer to those above method embodiments for the part which is not described in details and omitted for simplicity.

In the embodiments of the present invention, a unit or a module may be implemented in software. When the module may be implemented in software, in view of the art of the state in the field of hardware processing, with regard to all modules that can be implemented in software, their functions may be implemented in hardware by one skilled in the art without cost consideration. The hardware circuit may comprise a conventional Very Large Scale Integration (VLSI) circuit and a gate array and existing semiconductor element (such as, a logic chip, a transistor), or other discrete elements. A unit or module may also utilize a programmable hardware device, such as, a Field Programmable Gate Array device, a Programmable Array Logic device, or a Programmable Logic Device, etc.

A method for controlling a terminal device and the terminal device according to the embodiments of the present invention are presented above in details. Specific embodiments are employed herein to illustrate the principles and the implementations of the present invention. The illustrations of the embodiments are intended to facilitate the understanding of the methods and essential ideas of the present invention; meanwhile, for one ordinarily skilled in the art, various changes may come in specific embodiments and applications from the ideas of the present invention. In summary, the above description shall not be regarded as limit to the present invention.

What is claimed is:

1. A method applied in a terminal device for controlling the terminal device, the terminal device having a full instruction set, the method comprising:
   in a locked state:
   acquiring a first input comprising a start position and an end position;
   determining a hardware component unit corresponding to the first input, an application corresponding to the start position of the first input and at least two operating objects for the application, the hardware component unit is in a sleep state;
   determining positions for displaying the at least two operating object of the application;
   displaying the at least two operating objects at the respective positions;
   determining an operating object displayed at the end position of the first input;
   determining a first instruction of a first instruction set corresponding to the first input, the first instruction set being a first portion of the full instruction set, the first instruction being an unlocking instruction; and
   controlling a switching from the locked state to an unlocked state according to the unlocking instruction;
   in the unlocked state:
   determining a second instruction of a second instruction set corresponding to the first input, the second instruction set being an enable instruction for enabling the hardware component unit; and
   responding to the second instruction to enable the hardware component unit, and to launch the application and load the determined operating object.

2. The method according to claim 1, wherein the step of determining a second instruction of the second instruction set corresponding to the first input in the unlocked state comprises steps of:
   determining an invoking instruction for invoking an application corresponding to the hardware component unit as the second instructions.

3. The method according to claim 1,
   wherein the terminal device has a touch screen, and the first input comprises a sliding input on the touch screen; and
   wherein the step of determining a second instruction of the second instruction set corresponding to the first input in the unlocked state comprises: determining an instruction corresponding to a direction and/or shape of a sliding track generated by the sliding input as the second instruction, based on preset correspondences between directions and/or shapes of sliding tracks and respective instructions within the second instruction set, according to the direction and/or shape of the sliding track generated by the sliding input.

4. The method according to claim 1,
   wherein the terminal device has a touch screen, and the first input comprises an input of clicking or dragging a screen lock on the touch screen on which there are displayed a plurality of screen locks; and
   wherein the step of determining a second instruction of the second instruction set corresponding to the first input in the unlocked state comprises: determining an instruction corresponding to the clicking or dragging of the screen lock as the second instruction, based on preset correspondences between screen locks and respective instructions within the second instruction set, according to the clicking or dragging of the screen lock.

5. The method according to claim 1, wherein the step of determining a first instruction comprises:
   determining an end position of the first input;
   judging whether the end position fills into a preset state switching region to obtain a judging result; and
   generating the first instruction if the judging result indicates that the end position falls into the state switching region.

6. The method according to claim 5, wherein the step of determining a second instruction comprises: determining the second instruction corresponding to the end position according to preset correspondences between end positions and instructions.

7. The method according to claim 6,
   wherein the step of determining the second instruction corresponding to the end position according to preset correspondences between end positions and instructions comprises: determining the second instruction corresponding to the end position, according to preset correspondences between end positions and instructions, based on the start position.

8. A terminal device, the terminal device having a full instruction set, the terminal device comprising:
   a processor; and
   a memory having stored therein instructions which when executed on the processor, cause the processor to:
   in a locked state:
   acquire a first input comprising a start position and an end position;
   determine a hardware component unit corresponding to the first input, an application corresponding to the start position of the first input and at least two operating objects for the application, the hardware component unit is in a sleep state;
   determining positions for displaying the at least two operating object of the application;
   displaying the at least two operating objects at the respective positions;
   determining an operating object displayed at the end position of the first input;
   determine a first instruction of a first instruction set corresponding to the first input, the first instruction set being a first portion of the full instruction set, the first instruction being an unlocking instruction; and
   control a switching from the locked state to an unlocked state according to the unlocking instruction;

in the unlocked state:
    determine a second instruction of a second instruction set corresponding to the first input, the second instruction set being an enable instruction for enabling the hardware component unit; and
    respond to the second instruction to enable the hardware component unit, and to launch the application and load the determined operating object.

9. The terminal device according to claim 8, wherein the processor is further caused to:
    determine an invoking instruction for invoking an application corresponding to the hardware component unit as the second instructions.

10. The terminal device according to claim 8,
    wherein the terminal device has a touch screen, and the first input comprises a sliding input on the touch screen; and
    wherein the processor is further caused to:
    determine an instruction corresponding to a direction and/or shape of a sliding track generated by the sliding input as the second instruction, based on preset correspondences between directions and/or shapes of sliding tracks and respective instructions within the second instruction set, according to the direction and/or shape of the sliding track generated by the sliding input.

11. The terminal device according to claim 8,
    wherein the terminal device has a touch screen, and the first input comprises an input of clicking or dragging a screen lock on the touch screen on which there are displayed a plurality of screen locks; and
    wherein determine an instruction corresponding to the clicking or dragging of the screen lock as the second instruction, based on preset correspondences between screen locks and respective instructions within the second instruction set, according to the clicking or dragging of the screen lock.

12. A method applied in a terminal device for controlling the terminal device, the terminal device having a full instruction set, the method comprising:
    in a locked state:
        acquiring a first input comprising a start position and an end position;
        determining a hardware component unit corresponding to the first input, an application corresponding to the start position of the first input and at least two operating objects for the application, the hardware component unit is in a sleep state;
        determining positions for displaying the at least two operating object of the application;
        displaying the at least two operating objects at the respective positions;
        determining an operating object displayed at the end position of the first input;
        determining a first instruction corresponding to the first input, wherein the first instruction belongs to a first instruction set, the first instruction set being a first portion of the full instruction set; and
        responding to the first instruction; and
    in an unlocked state:
        determining a second instruction corresponding to the first input, wherein the second instruction belongs to a second instruction set, the second instruction set being an enable instruction for enabling the hardware component unit; and
        responding to the second instruction to enable the hardware component unit, and to launch the application and load the determined operating object.

13. The method for controlling according to claim 12,
    wherein the first instruction is an unlocking instruction, and
    wherein the responding in the locked state to the first instruction comprises: controlling a switching from the locked state to the unlocked state according to the unlocking instruction.

14. A terminal device, the terminal device having a full instruction set, the terminal device comprising:
    a processor; and
    a memory having stored therein instructions which when executed on the processor, cause the processor to:
    in a locked state:
        acquire a first input comprising a start position and an end position;
        determining a hardware component unit corresponding the first input, an application corresponding to the start position of the first input and at least two operating objects for the application, the hardware component unit is in a sleep state;
        determining positions for displaying the at least two operating object of the application;
        displaying the at least two operating objects at the respective positions;
        determining an operating object displayed at the end position of the first input;
        determine a first instruction corresponding to the first input, wherein the first instruction belongs to a first instruction set, the first instruction set being a first portion of the full instruction set;
        responding to the first instruction; and
    in an unlocked state:
        determine a second instruction corresponding to the first input, wherein the second instruction belongs to a second instruction set, the second instruction set being an enable instruction for enabling the hardware component unit; and
        respond to the second instruction to enable the hardware component unit, and to launch the application and load the determined operating object.

* * * * *